Patented Feb. 11, 1930

1,746,641

UNITED STATES PATENT OFFICE

JAMES G. FORD, OF WILKINSBURG, PENNSYLVANIA, ASSIGNOR TO WESTINGHOUSE ELECTRIC & MANUFACTURING COMPANY, A CORPORATION OF PENNSYLVANIA

PURIFICATION OF USED INSULATING OILS

No Drawing. Application filed August 6, 1927. Serial No. 211,267.

My invention relates to a process for chemically treating oils and more specifically to a process for refining mineral oils that are particularly useful for lubrication purposes and for insulation mediums in transformers and other oil-filled electrical apparatus.

It is among the objects of my invention to provide a process for removing impurities from hydrocarbon oils, such as water, asphaltic sludge, organic acids, and other organic bodies derived from the oxidation of the oils, such as alcohols, aldehydes, ketones and esters.

Another object of my invention is to provide a process for reconditioning oils that contain asphaltic sludge and other products of oxidation and that will, at the same time, dissolve part of the unsaturated hydrocarbons, which makes the process particularly useful when the original oil contains an excessive amount of such unsaturated hydrocarbons.

A further object of the invention is to provide a process for rejuvenating oils which have been in service in oil-filled electrical apparatus, which will not only remove the harmful properties in such oils, such as water, asphaltic sludge, acids, alcohols, ketones, esters and other organic bodies derived from the oxidation of oils, but which will also remove some of the unsaturated hydrocarbons that were originally present in the oil. As a result, an oil is provided that is comparable with the original oil and has better properties than an original oil containing an excessive amount of unsaturated hydrocarbons.

When oil used for transformers and other oil-filled electrical apparatus is exposed to oxidizing gases, impurities consisting of water, soluble and insoluble asphalt, organic acids and other oxidation products are formed. The asphalt which results primarily from the oxidation of the unsaturated hydrocarbons is a poor conductor of heat and, when precipitated on the working parts of a transformer in the form of sludge, causes overheating. If the sludge is not removed, an electrical breakdown of the transformer may result. Moreover, organic acids and intermediate oxidation products may attack the cellulose insulation and are harmful to the insulating properties of the oil when water is present.

It is known that mineral oils in their natural state contain considerable quantities of unsaturated aliphatic compounds, such as olefines, poly-olefines and unsaturated cyclic hydrocarbons of the aromatic series and that the amount of sludge that is formed is dependent, to a certain extent, upon the amount of these unsaturated compounds that are present. It was formerly thought that the unsaturated compounds were unnecessary in the oil, but I have found that they prevent the formation of acids and other oxidized products, although too large a percentage of unsaturated compounds has the tendency to form excessive amounts of sludge, which is precipitated in the ventilating ducts and on the cooling surfaces of the transformer and prevents the proper dissipation of the heat.

I have discovered that not only can the impurities mentioned above be removed from the oil by means of a treatment with liquid sulphur dioxide followed by treatment with infusorial earth, but part of the unsaturated hydrocarbons may also be removed and, as a result, I obtain a rejuvenated oil which is not only free from impurities, but may be better than the original oil, since part of the unsaturated hydrocarbons have been eliminated. In the event that too large a percentage of the unsaturated compounds have been removed, the oil may be mixed with another oil having a higher content of these compounds.

In practicing my process, the oil which has developed impurities by its use in transformers or other electrical apparatus is mixed in a suitable container with liquid sulphur dioxide, in amounts ranging from 25 to 50 percent of the volume of the oil, depending upon the condition of the oil to be treated, and the mixture thoroughly agitated for a sufficient length of time to enable the sulphur dioxide to become thoroughly mixed with the oil. This will usually require from 15 to 30 minutes, depending upon the amount of sulphur dioxide employed. The sulphur dioxide dissolves the acids, oxidation products, asphaltic sludge and part of the unsaturated compounds, and combines with the water to form sulphurous acid. The sulphur dioxide, with its reaction products and dissolved substances, settles to the bottom of the container and may be drained off; or, if preferred, the purified oil may be removed by decantation. In view of the fact that sulphur dioxide is a gas at ordinary temperatures, it is sometimes desirable to subject the oil to artificial cooling during the process. The sulphur dioxide may, however, be added to the oil at ordinary temperatures, in which case, a somewhat larger quantity is required. Any excess sulphur dioxide remaining in the oil may be removed by passing a current of air or nitrogen through the oil, or the removal may be effected by a weak solution of an alkali, such as potassium or sodium hydroxide. The oil is then treated with approximately 5 percent of its weight of infusorial earth, at a temperature of about 100° C., for approximately one hour, and the resulting mixture is filtered and centrifuged. The infusorial earth absorbs the residual asphaltic material and improves the color of the oil and its resistance to emulsification.

The process which I have outlined is particularly adaptable for the treatment of oxidized oils. It is known that if a mineral oil containing a large amount of unsaturated hydrocarbons is subjected to oxidizing gases, the unsaturated hydrocarbons will, through a gradual process of oxidation, form an insoluble asphalt known as sludge. A sample of a naphthene base oil containing sufficient unsaturated hydrocarbons to prevent excessive acid formation and having an original resistance to emulsification of 12 seconds, which is the time necessary for the oil to separate from water, according to the approved test of the American Society for Testing Materials, after being oxidized to the sludge point, was treated in the above manner, with the following results:

*Before treatment*

Color, dark red.
Acidity, .09 milligrams KOH required to neutralize one gram of oil.
Resistance to emulsification, 124 seconds.

*After treatment*

Color, straw yellow (very near original).
Acidity, neutral.
Resistance to emulsification, 14 seconds.

While I have described a specific modification of my invention, it will be understood that various other modifications may be made without departing from the spirit and scope thereof. I desire, therefore, to be limited only by the prior art and what is defined in the appended claims.

I claim as my invention:

1. The method of reconditioning oils which have been used in transformers or other oil-filled electrical apparatus which comprises mixing liquid sulphur dioxide with the oil and agitating the mixture to remove the water, acids, sludge and part of the unsaturated hydrocarbons, separating the oil from the insoluble mixture, treating the oil with infusorial earth to remove any residual sludge and to improve the color of the oil and its resistance to emulsification, and then filtering the purified oil to remove the infusorial earth and adsorbed products.

2. The method of reconditioning oils which have been used in transformers or other oil-filled apparatus which comprises adding liquid sulphur dioxide to the oil, agitating the mixture, removing the insoluble products, treating the oil with infusorial earth for about one hour at a temperature of about 100° C. to remove residual sludge and to improve the color of the oil and its resistance to emulsification, and then filtering and centrifuging the oil to remove the infusorial earth and absorbed products.

3. The method of reconditioning oils which have been used in transformers or other oil-filled electrical apparatus which comprises adding sufficient liquid sulphur dioxide to the oil to remove the sludge, organic acids and oxidation products but insufficient to remove all of the unsaturated compounds, agitating the mixture, removing the insoluble products, treating the oil with infusorial earth to remove residual sludge, to improve the color, and to increase the resistance to emulsification of the oil, and then filtering and centrifuging the oil to remove the infusorial earth and absorbed products.

4. The method of reconditioning oils which have been used in transformers or other oil filled electrical apparatus which comprises adding liquid sulphur dioxide to the oil to remove the water, sludge and oxidation products but only part of the unsaturated compounds, agitating the mixture, separating the oil from the sulphur dioxide and removed impurities, adding a weak alkali solution to the oil to remove any remaining sulphur dioxide, treating the oil with infusorial earth, and then filtering the oil from the infusorial and adsorbed products.

5. In the method of reconditioning oils which have been used in transformers or other oil-filled electrical apparatus, the steps which comprise mixing the oil with liquid sulphur dioxide in amounts ranging from 25 to 50 per cent of the volume of the oil and agitating the mixture for a sufficient length of time to remove the sludge, organic acids, and oxidation products but only a part of the unsaturated hydrocarbons.

In testimony whereof, I have hereunto subscribed my name this 3rd day of August, 1927.

JAMES G. FORD.